(12) United States Patent
Chen

(10) Patent No.: US 6,268,073 B1
(45) Date of Patent: Jul. 31, 2001

(54) FLASH LAYER OVERCOAT FOR MAGNETICALLY-INDUCED SUPER RESOLUTION MAGNETO-OPTICAL MEDIA

(75) Inventor: Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/433,377

(22) Filed: Nov. 3, 1999

Related U.S. Application Data

(60) Provisional application No. 60/107,698, filed on Nov. 9, 1998.

(51) Int. Cl.⁷ .......................................................... G11B 5/66
(52) U.S. Cl. .................. 428/694 ML; 427/131; 428/694 LE; 428/694 DE; 428/694 NF; 428/694 MM; 428/694 EC; 428/694 TC; 428/694 TF; 428/694 TM
(58) Field of Search ............... 428/694 ML, 694 LE, 428/694 DE, 694 NF, 694 MM, 694 EC, 694 TC, 694 TF, 694 TM, 900; 427/131

(56) References Cited

U.S. PATENT DOCUMENTS

| | | |
|---|---|---|
| 4,737,408 | 4/1988 | Kuwahara et al. . |
| 4,777,068 | 10/1988 | Omata et al. . |
| 4,925,733 | 5/1990 | Imataki et al. . |
| 5,053,288 | 10/1991 | Hashimoto et al. . |
| 5,506,023 | 4/1996 | Ohmori et al. . |
| 5,534,322 | 7/1996 | Ueyama et al. . |
| 5,540,988 | 7/1996 | Tachibana et al. . |
| 5,576,087 | 11/1996 | Watanabe et al. . |
| 5,580,633 | 12/1996 | Kuwahara et al. . |
| 5,604,005 | 2/1997 | Endo et al. . |
| 5,618,617 | 4/1997 | Uchida et al. . |
| 5,633,746 | 5/1997 | Sekiya et al. . |
| 5,637,393 | 6/1997 | Ueda et al. . |
| 5,674,638 | 10/1997 | Grill et al. . |
| 5,763,071 | 6/1998 | Chen et al. . |
| 5,776,602 | 7/1998 | Ueda et al. . |
| 5,786,078 | 7/1998 | Sekiya et al. . |
| 5,814,418 | 9/1998 | Nishikiori et al. . |
| 5,821,004 | 10/1998 | Hino et al. . |
| 5,824,387 | 10/1998 | Boutaghou et al. . |
| 5,825,723 | 10/1998 | Hirokane et al. . |
| 5,837,357 | 11/1998 | Matsuo et al. . |
| 5,853,871 | 12/1998 | Kitaori et al. . |
| 5,858,477 | * 1/1999 | Veerasamy et al. . |
| 5,858,520 | 1/1999 | Uchiyama . |
| 5,858,536 | 1/1999 | Yanagisawa . |
| 5,896,350 | * 4/1999 | Tamanoi et al. . |
| 5,914,198 | 6/1999 | Miyamoto et al. . |
| 5,958,649 | * 9/1999 | Hirotsune et al. . |

\* cited by examiner

*Primary Examiner*—Bernard Pianalto
(74) *Attorney, Agent, or Firm*—McDermott, Will & Emery

(57) ABSTRACT

Magnetically-induced, super-resolution (MSR), magneto-optical (MO) information storage media having improved tribological properties when used in high-density storage devices employing very small head flying heights are formed by providing a protective flash layer overcoat (FLO)/lubricant topcoat layer system on the media surface. Embodiments of the present invention include forming the FLO layer of an amorphous, abrasion-resistant, carbon-based, diamond-like material not greater than about 10 Å thick and selected from $CN_x$, $CH_x$, and $CN_xH_y$, and providing the lubricant topcoat as an about 15–25 Å thick layer of a fluoropolyether or perfluoropolyether compound, e.g., perfluoropolyethylene (PFPE).

16 Claims, 2 Drawing Sheets

FLASH LAYER OVERCOAT FOR MAGNETICALLY-INDUCED SUPER RESOLUTION MAGNETO-OPTICAL MEDIA

CROSS-REFERENCE TO PROVISIONAL APPLICATION

This application claims priority from provisional patent application Ser. No. 60/107,698 filed Nov. 9, 1998, the entire disclosure of which is incorporated herein by reference.

CROSS-REFERENCE TO RELATED APPLICATIONS

This application contains subject matter similar to subject matter disclosed in co-pending U.S. patent applications Ser. No. 09/433,375, filed on Nov. 3, 1999; Ser. No. 09/433,376, filed on Nov. 3, 1999; and Ser. No. 09/433,378, filed on Nov. 3, 1999.

FIELD OF THE INVENTION

The present invention relates to the recording, storage, and reading of information utilizing magneto-optical (MO) media, particularly rotatable MO storage media, such as in the form of thin film disks, and a protective overcoat/lubricant topcoat layer system for contact with cooperating transducer and/or sensor heads or devices.

BACKGROUND OF THE INVENTION

In recent years, much research and development of MO recording media for use as high density/high capacity memory devices has been carried out. Such media typically comprise a suitable substrate, e.g., of glass, polymer, metal, or ceramic material, coated with a perpendicularly magnetizable film used as a recording medium. Information is recorded within the medium by switching the direction of magnetization of desired portions (i.e., domains) of the perpendicularly magnetizable film. More specifically, for recording information, the recording medium is first initialized by applying to the medium a magnetic field from an externally positioned magnetic field generation device (i.e., external magnetic bias), thereby making the direction of the perpendicular magnetization uniformly upwardly or downwardly facing. A first laser beam of sufficiently high power or intensity from a suitable source, e.g., a laser diode, is then irradiated on desired recording portions of the recording medium in the presence of an externally applied magnetic bias field. As a consequence of the laser beam irradiation, the temperature of the irradiated portions (domains) of the recording medium rises, and when the temperature reaches or exceeds the Curie point of the vertically magnetizable film or its magnetic compensation point, the coercive force on the recording portion becomes zero or substantially zero. When this state is achieved at the desired recording portions of the medium, and in the presence of the externally biased magnetic field, the direction of the perpendicular magnetization is switched, e.g., from upwardly facing (=digital logic 1 or 0) to downwardly facing (=digital logic 0 or 1, respectively) or vice versa, so as to be aligned with that of the external magnetic field. At the end of a write pulse (i.e., laser pulse), the temperature of the heated recording domain then decreases and eventually returns to room temperature by cessation of the laser beam irradiation thereof. Since the alignment direction of magnetization of the recording media effected by the laser pulse heating to above the Curie temperature is maintained at the lowered temperature, desired information can thus be recorded in the magneto-optical media.

For reading the information stored in the MO media according to the above-described method, the recorded portions of the media are irradiated with a second, linearly polarized laser beam of lower power or intensity than the one used for recording, and light reflected or transmitted from the recorded portions is detected, as by a suitable detector/sensor means. The recorded information is read out by detecting the Kerr rotation angle of the polarization plane of light reflected from the recording layer or the Faraday rotation angle of the polarization plane of light transmitted through the recording layer. More particularly, since the rotation angle of the polarization plane varies depending upon the direction of magnetization of the recorded portions of the media according to the Kerr or Faraday effect, information stored within the media can be read out optically by a differential detector which decodes the polarization-modulated light beam into bits of information.

Such MO recording media, when fabricated in disk form for rotation about a central axis, can be adapted for use in conventional Winchester, or hard drive, devices as are employed with conventional magnetic recording media. Hard drives typically employed for such disk-shaped media utilize flying heads for mounting transducer/sensor devices, etc., thereon, for close positioning thereof adjacent the surface of the recording media. In operation, a typical contact start/stop (CSS) method commences when a data transducing head begins to slide against the surface of the disk as the disk begins to rotate. Upon reaching a predetermined high rotational speed, the head floats in air at a predetermined small distance from the surface of the disk, where it is maintained during reading and recording operations. Upon terminating operation of the disk drive, the head again begins to slide against the surface of the disk and eventually stops in contact with and pressing against the disk. Therefore, as in the case of magnetic disks, a lubricant (optionally with an underlying protective layer) is typically applied to the disk surface for minimizing scratching and abrasion of the sensor/transducer head and the recording media surface, which can result in an undesirably high wear rate of the head and recording media surface.

However, in the case of portable MO recording devices, the use of a lubricating oil, e.g., a fluorocarbon-based oil, is problematic in that it is difficult to maintain the lubricating oil on the surface of the MO media, thereby increasing surface scratching and wear. In addition, MO disks produced without lubricating oil on their surface by some manufacturers are not necessarily compatible with similar media produced with lubricating oil by other manufacturers.

In another approach for minimizing abrasion, scratching, and wear of transducer heads, a solid lubricant is applied to the bottom surface of the flying head which comes into contact with the surface of the MO recording medium. However, such solid lubricant applied to the bottom surface of the flying head must have a durability many times greater than lubricant applied to the MO recording medium. As a consequence, application of solid lubricant only to the flying head is not sufficient for adequately reducing abrasion, scratching, and wear.

An additional difficulty encountered in the development of wear-resistant, lubricated MO recording media and Winchester-type drives therefor, is the requirement imposed by the impetus for achieving ever-higher density recording, which necessitates further reduction in the disk-transducer/sensor spacing. The head-to-disk interface (HDI) becomes very critical as head-disk spacing is reduced and head fly height decreases. Conventional MO media without a protective overcoat and lubricant layer have extremely poor tribological performance, resulting in lack of reliability of MO-based disk drives.

The above-described problems, including disk crashing during head loading, associated with the requirement for reduced head-disk spacing and fly height, are further exacerbated in the case of magnetically-induced super resolution ("MSR") MO media wherein enhanced recording density is provided by interposing an exchange coupling force layer or a static coupling layer between the MO writing and read-out layers, as will be further described in more detail below.

Thus, there exists a need for a protective overcoat or protective overcoat/lubricant topcoat layer system which enables the manufacture of reliable, very high density recording magnetically-induced, super-resolution, MO-based disk drives, which layer system effectively eliminates the problems and drawbacks associated with the conventional technology, i.e., scratching, abrasion, brittleness, increased wear of transducer/sensor head and recording media surfaces, and tendency for crashing during head loading.

The present invention addresses and solves the problems attendant upon the use of magnetically induced, super-resolution, MO-based disk-shaped recording media and hard drives, while maintaining full compatibility with all mechanical aspects of conventional disk drive technology.

DISCLOSURE OF THE INVENTION

An advantage of the present invention is a high density, magnetically-induced, super-resolution, MO-based recording medium having improved tribological performance and long-term durability.

Another advantage of the present invention is a magnetically-induced, super-resolution, MO-based recording medium having an improved protective overcoat layer.

A further advantage of the present invention is a magnetically-induced, super-resolution, MO-based recording medium having an improved protective overcoat/lubricant topcoat layer system.

Yet another advantage of the present invention is a magnetically-induced, super-resolution, MO-based, disk-shaped recording medium providing improved performance at decreased head-to-disk spacings.

Still another advantage of the present invention is single- and dual-sided magnetically-induced, super-resolution, MO-based media having protective overcoat layer/lubricant topcoat layer systems thereon providing improved ribological performance.

Additional advantages and other features of the present invention will be set forth in the description which follows and in part will become apparent to those having ordinary skill in the art upon examination of the following or may be learned from practice of the present invention. The advantages of the present invention may be realized and obtained as particularly pointed out in the appended claims.

According to one aspect of the present invention, the foregoing and other advantages are obtained in part by a magnetically-induced, super-resolution, MO storage medium including at least one laminate of layers comprising, in sequence from a substrate surface: an MO writing layer; an MO exchange coupling layer or a dielectric layer for magneto-static coupling between the MO writing layer and a MO read-out layer for increasing the recording density; an MO read-out layer; a dielectric layer which is transparent to the wavelength(s) of at least one laser beam used for writing and reading out information stored in the medium; and an amorphous, abrasion resistant, carbon-based protective overcoat layer over the transparent dielectric layer.

According to embodiments of the present invention, the amorphous, abrasion resistant protective overcoat layer has a thickness not greater than about 10 Å thick, e.g., from about 5 to about 10 Å and comprises a diamond-like material selected from a-$CN_x$, a-$CH_x$, and a-$CN_xH_y$; and the laminate further comprises a lubricant topcoat layer on the protective overcoat layer, the lubricant topcoat layer comprising a fluoropolyether or a perfluoropolyether compound and having a thickness of from about 15 to about 25 Å.

According to further embodiments of the present invention, the substrate includes a pair of opposed major surfaces and comprises a material selected from the group consisting of polymers, metals, glass, and ceramics; the laminate of layers comprises a set of layers formed on one of the pair of opposed major surfaces, the layer set comprising, in overlying sequence from the substrate:

(a) a reflective, heat sinking layer formed on one of the pair of opposed major surfaces of the substrate;

(b) a first dielectric layer comprising a material which is substantially transparent to the at least one laser beam wavelength;

(c) an MO auxiliary, writing assist layer comprising a rare earth/transition metal (RE/TM) material;

(d) an MO writing layer comprising an RE/TM thermo-magnetic material having perpendicular anisotropy, large perpendicular coercivity, and high Curie temperature;

(e) an MO exchange coupling layer comprising an RE-TM material, for replicating the magnetic orientation of the MO writing layer and thereby increasing the coupling force between the MO writing layer and the MO read-out layer; or (f) a second dielectric layer comprising a material which is substantially transparent to the at least one laser beam wavelength and performs magneto-static coupling between MO writing and read-out layers;

(g) an MO read-out layer comprising an RE-TM material having a small coercivity; and (h) a third dielectric layer comprising a material which is substantially transparent to the at least one laser beam wavelength;

wherein the protective overcoat layer is formed on the third dielectric layer and the lubricant topcoat layer is formed over the protective overcoat layer.

According to embodiments of the present invention:

the reflective, heat sinking layer (a) comprises aluminum (Al) or an alloy thereof;

each of the first, second, and third substantially transparent dielectric layers (b), (f), and (h) comprises a material selected from the group consisting of: $SiN_x$, $AlN_x$, $SiO_x$, and $AlO_x$;

the MO auxiliary, writing assist layer (c) comprises an RE-TM material selected from the group consisting of TbFe, TbFeCo, and FeCoX, where X is Dy, Gd, or Sm;

the MO writing layer (d) comprises an RE-TM material selected from the group consisting of: TbFe, TbFeCo, TbFeCoX, TbDyFeCo, and TbDyFeCoX, where X is Al, Y, or Nd, and DyFeCoX, where X is Y, Nd, or Al;

the MO exchange coupling layer (e) comprises an RE-TM material selected from the group consisting of: Gd, GdFe, GdFeSi, and GdFeAl; and the MO read-out layer (g) comprises an RE-TM material having in-plane magnetization at room temperature, selected from the group consisting of: GdFeCo and GdFeCoX, where X is Al, Nd, or Y, and GdFeCoXX', where X is Al, Nd, or Y and X' is Cr, Ta, or Nb.

In a further embodiment according to the present invention, the medium comprises another layer stack, identical to the above-described layer stack, formed on the other one of the pair of opposed major surfaces of the substrate.

According to another aspect of the present invention, a magnetically-induced, super-resolution magneto-optical (MO) storage medium includes at least one laminate of layers comprising, in sequence from a substrate surface, an MO writing assist layer, an MO writing layer, an MO exchange coupling layer or a magneto-static coupling layer for increasing the writing density, an MO read-out layer, and a dielectric layer which is substantially transparent to the wavelength(s) of at least one laser beam used for writing and reading-out information stored in the medium, the medium further comprising:

an amorphous, abrasion-resistant, carbon-based, protective overcoat over the transparent dielectric layer, the protective overcoat layer having a thickness not greater than about 10 Å and comprising a diamond-like material selected from the group consisting of: a-CN, a-CH$_x$, and a-CN$_x$H$_y$; and a lubricant topcoat layer having a thickness of from about 15 to about 25 Å on the protective overcoat layer, the lubricant topcoat layer comprising a fluoropolyether polymer or a perfluoropolyether polymer.

According to yet another aspect of the present invention, a magnetically-induced, super-resolution (MSR), magneto-optical (MO) storage medium includes:

a substrate; and means for protecting the exterior surface of the medium.

Additional advantages of the present invention will become readily apparent to those skilled in the art from the following detailed description, wherein only preferred embodiments of the invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not as limitative.

BRIEF DESCRIPTION OF THE DRAWINGS

The following detailed description of the embodiments of the present invention can best be understood when read in conjunction with the following drawings, in which like reference numerals are employed throughout to designate similar features, wherein.

Figure 1:
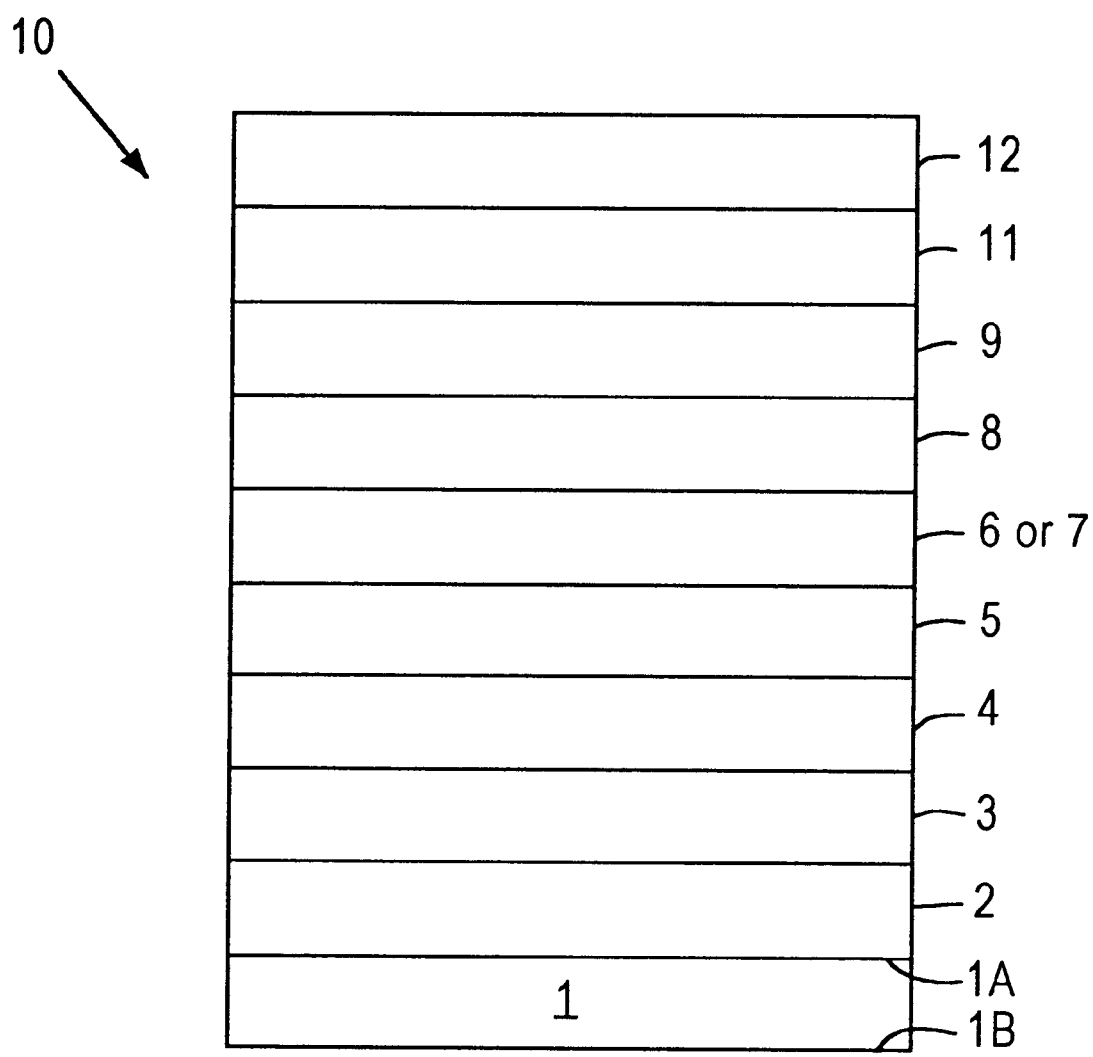
FIG. 1 illustrates, in simplified, cross-sectional schematic form, a MO medium according to a single-sided embodiment according to the present invention.

It should be recognized that the various layers forming the layer stacks or laminates in the appended figures representing cross-sections of portions of MO media fabricated according to the inventive methodology are not drawn to scale, but instead are drawn as to best illustrate the features of the present invention.

BACKGROUND OF THE INVENTION

The present invention is based on the discovery that an ultra-thin, "flash-layer" protective overcoat ("FLO") and FLO protective overcoat/lubricant topcoat layer system comprised of specific materials can provide optimal tribological performance of magnetically-induced, super-resolution ("MSR") MO-based media, such as disks, with minimal lubricant topcoat layer thicknesses and head-to-disk spacings (i.e., flying heights) less than about 2 micro-inches ($\mu$ inch) for media with polymeric substrates; less than about 1$\mu$ inch for media with metal, glass, or ceramic substrates with Ra of from about 3 to about 5 Angstroms; and less than about 0.5$\mu$ inch for media with glass, glass-ceramic, or ceramic substrates with Ra of from about 2 to about 3 Å More specifically, according to the present invention, an ultra-thin FLO layer comprising an amorphous, hard, carbon-based, abrasion-resistant protective material, e.g., a carbon-based diamond-like material such as a-CN$_x$ (where x=0.05–0.30), a-CH$_x$ (where x=0.20–0.30), and a-CN$_x$H$_y$ (where x=0.03–0.10 and y=0.15–0.30), is formed to cover the uppermost transparent dielectric layer, typically a SiN$_x$ material, formed over the MO read-out layer of such type MO media. The amorphous, diamond-like protective overcoat layer has a thickness not greater than about 10 Å, e.g., about 5 to about 10 Å, and can be formed by any of the physical vapor deposition (PVD) or chemical vapor deposition (CVD) methods conventionally employed for depositing such type layers. By way of illustration, but not limitation, a-CH$_x$ layers may be deposited on suitable dielectrically coated MO media substrates by AC sputtering of a 3 inch by 15 inch graphite target at frequencies in the range of 40–400 KHz at a power in the range of 0.5–2 KW in an atmosphere of 15% H$_2$/85% Ar. Similar conditions may be employed for forming a-CN$_x$ and a-CN$_x$H$_y$ coatings by use of N$_2$ and H$_2$—N$_2$ mixtures, respectively. Given the present disclosure and the objectives of the invention, determination and selection of the parameters necessary for obtaining equivalently performing diamond-like amorphous carbon-containing coatings by other conventional film-forming techniques is considered within the ambit of the artisan for use in a particular situation.

The lubricant topcoat layer formed over the protective overcoat layer, in embodiments according to the present invention, comprises fluoropolyether or perfluoropolyether polymers such as, for example, perfluoropolyethylene (PFPE), and like materials available under the tradenames Fomblin ZDol, Fomblin AM2001, and Fomblin Z-Dol TX from Ausimont, Thorofare, N.J., and has a thickness not greater than about 25 Å, e.g., from about 10 to about 25 Å.

The lubricant topcoat layer can be applied in any conventional manner, as by dipping in a dilute solution of the lubricant in a suitable solvent, e.g., a hydrofluorocarbon, or by spraying, etc. Desirably, the surface of the disk is preliminarily treated to be free of impurities so that good bonding can occur between the functional end groups of the lubricant polymer molecules and the substrate surface (i.e., the protective overcoat layer). The bonding of the lubricant to the surface of the disk can be enhanced by cleaning the surface of the protective overcoat layer with a mild plasma or a solvent rinse prior to applying the lubricant.

By way of illustration, but not limitation, magnetically-induced, super-resolution (MSR) MO media provided with a 5–10 Å thick amorphous, carbon-based, diamond-like protective overcoat layer selected from a-CH$_x$, a-CN$_x$, and a-CN$_x$H$_y$ and coated with 15–25 Å thick lubricant topcoat layers of Fomblin Zdol and Fomblin AM2001, provided excellent tribological and stiction properties at reduced fly heights of from about 2 to about 5µ inches for media with polymeric substrates and from about 0.5 to about 2µ inches for media with metal, glass, or ceramic substrates.

An embodiment of the present invention comprises a single-sided, magnetically-induced, super-resolution (MSR) MO medium 10 employing the inventive flash layer protective overcoat (FLO) and FLO/lubricant topcoat layer system and is illustrated in FIG. 1, wherein reference numeral 1 denotes a substrate comprising a pair of major opposed surfaces 1A and 1B. The material of the substrate is not critical for the practice of the invention, and may be selected from polymers, metals, glass, and ceramics. The thickness of substrate 1 is also not critical, but must provide adequate rigidity during rotation and static periods.

Formed on a first one (1A) of the opposing major surfaces of substrate 1 is a layer stack, comprising, in overlying sequence from substrate surface 1A: (a) a reflective, heat-sinking layer 2 about 300–700 Å thick, preferably about 500 Å thick, typically comprising Al or an alloy thereof, e.g., AlCr, AlTi, etc.; (b) a first dielectric material layer 3 about 100–400 Å thick, preferably about 100–200 Å thick, and substantially transparent to the wavelength(s) of the at least one laser beam employed for writing and reading out information, typically selected from $SiN_x$ (where x=ca. 0.8–1.33), $AlN_x$ (where x=ca. 1–1.5), $SiO_x$ (where x=ca. 1–2.0), and $AlO_x$ (where x=ca. 1–1.5); (c) a MO auxiliary, writing assist layer 4 comprising a RE-TM material about 50–100 Å thick, typically selected from TbFe, TbFeCo, and FeCoX, where X is Dy, Gd, or Sm; (d) a MO writing layer 5 comprising a RE-TM material about 200–300 Å thick and having perpendicular anisotropy, large perpendicular coercivity, and high Curie temperature, typically selected from TbFe, TbFeCo, TbDyFeCo, TbFeCoX, and TbDyFeCoX, where X is Al, Y, or Nd, and DyFeCoX, where X is Y, Nd, or Al; (e) an MO exchange coupling layer 6 comprising a RE-TM material about 10–50 Å thick, for replicating the magnetic orientation of the MO writing layer 5 and thereby increasing the coupling force between the MO writing layer 5 and the MO read-out layer 8, typically selected from Gd, GdFe, GdFeSi and GdFeAl; or (f) a second dielectric material layer 7, for performing magneto-static coupling between MO writing layer 5 and MO read-out layer 8, the second dielectric layer 7 being about 5–50 Å thick and substantially transparent to the wavelength(s) of the at least one laser beam employed for writing and reading out information, typically selected from $SiN_x$, $AlN_x$, $SiO_x$, and $AlO_x$, where x in each instance is as given above for layer 3; (g) a MO readout layer 8 comprising a RE-TM material about 200–400 Å thick, typically selected from GdFeCo and GdFeCoX, where X is Al, Nd, or Y, and GdFeCoXX', where X is Al, Nd, or Y, and X' is Cr, Ta, or Nb; (h) a third dielectric material layer 9, substantially transparent to the wavelength(s) of the at least one laser beam employed for writing and reading out information, i.e., about 400–500 Å for blue lasers and about 800–1200 Å for red lasers, typically selected from $SiN_x$, $AlN_x$, $SiO_x$, and $AlO_x$, where x in each instance is as given above for layer 3; (i) an amorphous, diamond-like protective overcoat layer 11 not greater than about 10 Å Å thick, typically about 5 to about 10 Å thick and comprising a material as described supra, i.e., a-$CN_x$ (where x=0.05–0.30), a-$CH_x$ (where x=0.20–0.30), or a-$CN_xH_y$ (where x=0.03–0.10 and y=0.15–0.30); and (j) a lubricant topcoat layer 12 having a thickness of about 15–25 Å and comprised of a fluoropolyether or perfluoropolyether polymer compound, e.g., perfluoropolyethylene (PFPE).

It should be noted that MSR-MO media, such as described above, can have two alternate layer configurations, i.e., a magnetic exchange coupling configuration utilizing MO exchange coupling layer 6 and not requiring second dielectric layer 7, and a magneto-static coupling configuration utilizing second dielectric layer 7 and not requiring MO exchange coupling layer 6.

Figure 2:
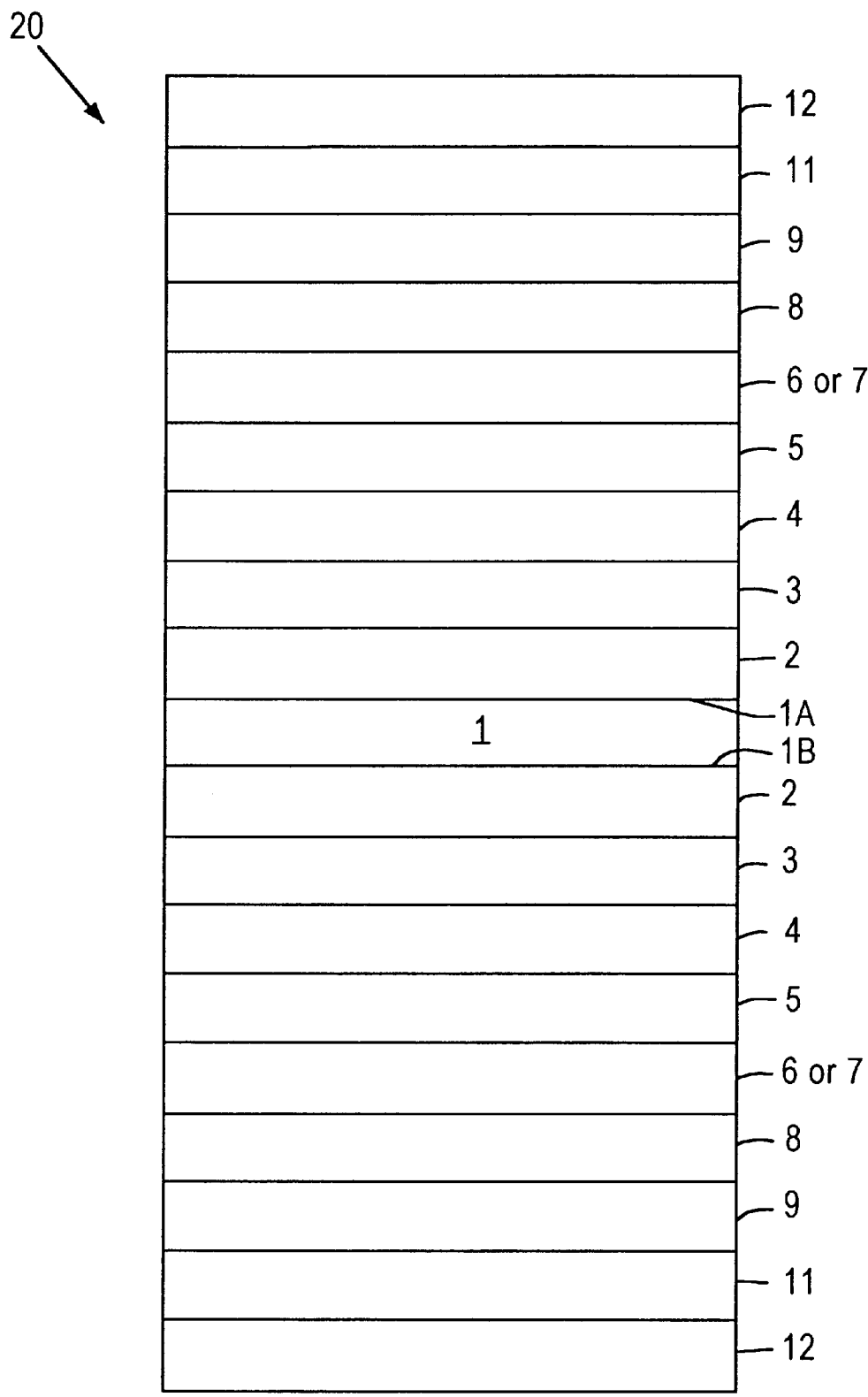
FIG. 2 illustrates, in simplified, cross-sectional schematic form, a MO medium according to a dual-sided embodiment according to the present invention.

FIG. 2 illustrates another, dual-sided embodiment corresponding to the single-sided, first embodiment shown in FIG. 1 and described above. Such dual-sided media advantageously may be operated to record and read out information from both sides of a common substrate, and thus are useful for increasing storage density. As for the dual-sided embodiment of FIG. 2, medium 20 comprises a second layer stack formed on the second major surface 1B of substrate 1, in opposing relation to the first layer stack formed on the first major surface 1A, with both layer stacks being identically constituted as shown in FIG. 1.

Conventional techniques, such as PVD and/or CVD may be employed for depositing each of the reflective, dielectric, auxiliary, writing, exchange coupling, and read-out MO RE-TM layers, as well as the protective overcoat layers of the layer stacks of the above-described embodiments, with sputtering generally being preferred. The lubricant topcoat layer is readily deposited by conventional dipping techniques, as indicated above. Therefore, details of the deposition techniques utilized for forming each of the layers of the layer stack are generally omitted from the present disclosure for brevity and in order not to unnecessarily obscure the present invention.

Thus, the present invention advantageously provides, as by the use of conventional processing techniques, high quality, magnetically-induced, super-resolution, MO information storage media having novel, ultra-thin, abrasion-resistant, carbon-based, flash layer overcoats (FLO) imparting improved tribological properties thereto and therefore suitable for use in high density storage devices requiring minimal head fly height.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A magnetically-induced, super-resolution (MSR), magneto-optical (MO) storage medium including at least one laminate of layers comprising, in sequence from a substrate surface:

an MO writing layer;

an MO exchange coupling layer or a magneto-static coupling layer for increasing the recording density;

an MO read-out layer;

a dielectric layer which is substantially transparent to the wavelength(s) of at least one laser beam used for writing and reading out information stored in said medium; and an amorphous, abrasion resistant, carbon-based protective overcoat layer over said transparent dielectric layer.

2. The medium according to claim 1, wherein:

said abrasion resistant protective overcoat layer comprises a material selected from the group consisting of: a-$CN_x$, where x=0.05–0.30; a-$CH_x$, where x=0.20–0.30; and a-$CN_xH_y$, where x=0.03–0.10 and y=0.15–0.30.

3. The medium according to claim 2, wherein said protective overcoat layer has a thickness not greater than about 10 Å.

4. The medium according to claim 2, wherein said protective overcoat layer has a thickness of from about 5 to about 10 Å.

5. The medium according to claim 1, wherein said laminate further comprises a lubricant topcoat layer on said protective overcoat layer.

6. The medium according to claim 5, wherein said lubricant topcoat layer comprises a fluoro polyether or perfluoro polyether lubricant.

7. The medium according to claim 6, wherein said lubricant topcoat layer has a thickness of from about 15 to about 25 Å.

8. The medium according to claim 1, wherein said substrate includes a pair of opposed major surfaces and comprises a material selected from the group consisting of: polymers, metals, glass, and ceramics.

9. The medium according to claim 8, wherein said laminate of layers comprises a stack of layers formed on one of said pair of opposed major surfaces, said layer stack comprising, in overlying sequence from said substrate:

(a) a reflective, heat sinking layer formed on one of said pair of opposed major surfaces of said substrate;

(b) a first dielectric layer comprising a material which is substantially transparent to said at least one laser beam wavelength;

(c) an MO auxiliary, writing assist layer comprising a rare earth/transition metal (RE-TM) material;

(d) an MO writing layer comprising an RE-TM thermomagnetic material having perpendicular anisotropy, large perpendicular coercivity, and high Curie temperature;

(e) an MO exchange coupling layer comprising an RE-TM material, for replicating the magnetic orientation of the MO writing layer and thereby increasing the coupling force between the MO writing layer and the MO read-out layer; or (f) a magneto-static coupling layer comprising a second dielectric layer comprising a material which is substantially transparent to said at least one laser beam wavelength and performs exchange decoupling;

(g) an MO read-out layer comprising an RE-TM material having a small coercivity; and (h) a third dielectric layer comprising a material which is substantially transparent to said at least one laser beam wavelength;

wherein said protective overcoat layer is formed on said third dielectric layer.

10. The medium according to claim 9, further comprising a lubricant topcoat layer over said protective overcoat layer.

11. The medium according to claim 9, wherein:

said reflective, heat sinking layer (a) comprises aluminum or an alloy thereof;

each of said first, second, and third substantially transparent dielectric layers (b), (f), and (h) comprises a material selected from the group consisting of: $SiN_x$, where x=0.8–1.33; $AlN_x$, where x=ca. 1–1.5; $SiO_x$, where x=ca. 1–2.0; and $AlO_x$, where x=ca. 1–1.5;

said MO auxiliary, writing assist layer (c) comprises an RE-TM material selected from the group consisting of: TbFe, TbFeCo, and FeCoX, where X is Dy, Gd, or Sm;

said MO writing layer (d) comprises an RE-TM material selected from the group consisting of: TbFe, TbFeCo, TbDyFeCo, TbFeCoX, and TbDyFeCoX, where X is Al, Y, or Nd, and DyFeCoX, where X is Y, Nd, or Al;

said MO exchange coupling layer (e) comprises an RE-TM material selected from the group consisting of Gd, GdFe, GdFeSi, and GdFeAl; and said MO read-out layer (g) comprises an RE-TM material selected from the group consisting of: GdFeCo and GdFeCoX, where X is Al, Nd, or Y, and GdFeCoXX', where X is Al, Nd, or Y and X' is Cr, Ta, or Nb.

12. The medium according to claim 11, comprising another layer stack, identical to the abovesaid layer stack, formed on the other one of said pair of opposed major surfaces of said substrate.

13. A magnetically-induced, super-resolution, magneto-optical (MO) storage medium including at least one laminate of layers comprising, in sequence from a substrate surface:

an MO writing assist layer;

an MO writing layer;

an MO exchange coupling layer or a magneto-static coupling layer in contact with the MO writing layer for increasing the recording density thereof;

an MO read-out layer;

a dielectric layer which is substantially transparent to the wavelength(s) of at least one laser beam used for writing and reading-out information stored in said medium;

an amorphous, abrasion resistant, carbon-based, protective overcoat layer over said transparent dielectric layer, said protective overcoat layer having a thickness not greater than about 10 Å and comprising a diamond-like material selected from the group consisting of: a-$CN_x$, where x=0.05–0.30; a-$CH_x$, where x=0.20–0.30; and a-$CN_xH_y$, where x=0.03–0.10 and y=0.15–0.30; and a lubricant topcoat layer having a thickness of from about 15 Å to about 25 Å on said protective overcoat layer, said lubricant topcoat layer comprising a fluoro polyether polymer or a perfluoro polyether polymer.

14. The medium according to claim 13, wherein said substrate includes a pair of opposed major surfaces and comprises a material selected from the group consisting of: polymers, metals, glass, and ceramics.

15. The medium according to claim 14, wherein said laminate of layers comprises a stack of layers formed on one of said pair of opposed major surfaces, said layer stack comprising, in overlying sequence from said substrate:

(a) a reflective, heat sinking layer formed on said one of said pair of opposed major surfaces of said substrate and comprising aluminum or an alloy thereof;

(b) a first dielectric layer comprising a material which is substantially transparent to said at least at least one laser beam wavelength and selected from the group consisting of: $SiN_x$, where x=ca. 0.8–1.33; $AlN_x$, where x=ca. 1–1.5; $SiO_x$, where x=ca. 1–2.0; and $AlO_x$, where x=ca. 1–1.5;

(c) an MO auxiliary, writing assist layer comprising an RE-TM material selected from the group consisting of: TbFe, TbFeCo, and FeCoX, where X is Dy, Gd, or Sm;

(d) an MO writing layer comprising an RE-TM themo-magnetic material having perpendicular anisotropy, large perpendicular coercivity, high Curie temperature, and selected from the group consisting of: TbFe, TbFeCo, TbFeCoX, TbDyFeCo, and TbDyFeCoX, where X is Al, Nd, or Y, and DyFeCoX, where X is Al, Nd, or Y;

(e) an MO exchange coupling layer comprising an RE-TM material comprising Gd, GdFe, GdFeSi, or GdFeAl, for replicating the magnetic orientation of the MO writing layer and thereby increasing the coupling force between the MO writing layer and the MO read-out layer; or (f) a magneto-static coupling layer comprising a second dielectric layer comprising a material which is substantially transparent to said at least one laser beam wavelength, selected from the group consisting of: $SiN_x$, where x=ca. 0.8–1.33; $AlN_x$, where x=ca. 1–1.5: $SiO_x$, where x=ca. 1–2.0m; and $AlO_x$, where x=ca. 1–1.5 ;

(g) an MO read-out layer comprising an RE-TM material selected from the group consisting of: GdFeCo and GdFeCoX, where X is Al, Nd, or Y, and GdFeCoXX', where X is Al, Nd, or Y and X' is Cr, Ta, or Nb; and (h) a third dielectric layer comprising a material which is substantially transparent to said at least one laser beam wavelength and selected from the group consisting of: $SiN_x$, where x=ca. 0.8–1.33; $AlN_x$, where x=ca. 1–1.5; $SiO_x$, where x=ca. 1–2.0; and $AlO_x$, where x=ca. 1–1.5;

wherein said protective overcoat layer is formed on said third transparent dielectric layer and said lubricant topcoat layer is formed on said protective overcoat layer.

16. The medium according to claim 15, comprising another layer stack, identical to the abovesaid layer stack, formed on the other one of said pair of opposed major surfaces of said substrate.

* * * * *